(12) United States Patent
Kim et al.

(10) Patent No.: US 10,955,602 B2
(45) Date of Patent: Mar. 23, 2021

(54) REFLECTIVE POLARIZER MODULE HAVING LIGHT RECYCLING IMPROVING SHEET, AND BACK LIGHT UNIT HAVING SAME

(71) Applicant: LMS Co., Ltd., Pyeongtaek-si (KR)

(72) Inventors: Yeong Il Kim, Seongnam-si (KR); Eun Mi Lee, Suwon-si (KR); Jang Hee Cho, Suwon-si (KR); Seung Jun Noh, Gunpo-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 238 days.

(21) Appl. No.: 15/543,208

(22) PCT Filed: Jan. 14, 2016

(86) PCT No.: PCT/KR2016/000378
§ 371 (c)(1),
(2) Date: Jul. 12, 2017

(87) PCT Pub. No.: WO2016/114597
PCT Pub. Date: Jul. 21, 2016

(65) Prior Publication Data
US 2018/0003873 A1 Jan. 4, 2018

(30) Foreign Application Priority Data
Jan. 15, 2015 (KR) ........................ 10-2015-0007226

(51) Int. Cl.
*G02B 5/30* (2006.01)
*G02B 6/00* (2006.01)
(Continued)

(52) U.S. Cl.
CPC ........... *G02B 5/305* (2013.01); *G02B 5/0284* (2013.01); *G02B 6/00* (2013.01); *G02B 6/0046* (2013.01);
(Continued)

(58) Field of Classification Search
None
See application file for complete search history.

(56) References Cited

U.S. PATENT DOCUMENTS

2007/0115407 A1* 5/2007 Richard ............ G02F 1/133536
349/112
2007/0242184 A1* 10/2007 Ohta ................. G02F 1/133606
349/64

(Continued)

FOREIGN PATENT DOCUMENTS

CN 1791829 A 6/2006
CN 102869706 A 1/2013
(Continued)

OTHER PUBLICATIONS

International Search Report dated May 23, 2016 issued in parent application PCT/KR2016/000378.
(Continued)

*Primary Examiner* — Derek S. Chapel
(74) *Attorney, Agent, or Firm* — Polsinelli PC

(57) ABSTRACT

The present disclosure provides a reflective polarizer module characterized by comprising: a first light collecting sheet including a first structuring pattern having a first unit light collector, the cross-sectional area of which is reduced progressively upward, which is disposed continuously in a repetitive manner, and collecting a light transmitted from below; a reflective polarizer sheet disposed in a stacked configuration on the top of the first light collecting sheet, and selectively transmitting the light by having a plurality of stacked layers having mutually different refractive indices; and a light recycling improving sheet disposed at the bottom of the reflective polarizer sheet, and randomly changing the polarized direction of the light which is not transmitted through the reflective polarizer sheet but is reflected downward.

6 Claims, 10 Drawing Sheets

(51) Int. Cl.
*G02F 1/1335* (2006.01)
*G02B 5/02* (2006.01)
*F21V 8/00* (2006.01)
*G02F 1/13357* (2006.01)
*G02B 5/04* (2006.01)

(52) U.S. Cl.
CPC ......... *G02B 6/0051* (2013.01); *G02B 6/0055* (2013.01); *G02F 1/13362* (2013.01); *G02F 1/133536* (2013.01); *G02B 5/045* (2013.01); *G02F 1/133507* (2021.01); *G02F 1/133567* (2021.01); *G02F 1/133607* (2021.01)

(56) References Cited

U.S. PATENT DOCUMENTS

| | | | | |
|---|---|---|---|---|
| 2010/0026934 | A1* | 2/2010 | Sun | G02F 1/133606 349/74 |
| 2013/0038822 | A1* | 2/2013 | Aono | C08J 3/14 349/96 |
| 2013/0148198 | A1* | 6/2013 | Min | G02B 27/00 359/485.03 |
| 2014/0139787 | A1 | 5/2014 | Ki et al. | |

FOREIGN PATENT DOCUMENTS

| | | |
|---|---|---|
| JP | 2008123815 A | 5/2008 |
| TW | 350921 B | 1/1999 |

OTHER PUBLICATIONS

Chinese Office Action dated Mar. 4, 2019 in corresponding Patent Application No. 201680006026.4 (13 pages).

* cited by examiner

REFLECTIVE POLARIZER MODULE HAVING LIGHT RECYCLING IMPROVING SHEET, AND BACK LIGHT UNIT HAVING SAME

CROSS-REFERENCE TO RELATED APPLICATIONS

The present application claims the benefit of Korean Patent Application No. 10-2015-0007226 filed on Jan. 15, 2015 and PCT Application No. PCT/KR2016/000378 filed on Jan. 14, 2016, which are hereby incorporated by reference in their entirety.

BACKGROUND

Field of the Disclosure

The present disclosure relates to display device, and more particularly, to a reflective polarizer module having a light recycling improving sheet and a backlight unit having same. Although the present disclosure is suitable for a wide scope of applications, it is particularly suitable for providing a reflective polarizer module having a light recycling improving sheet for improving a recycling which is disposed at the bottom of a reflective polarizer sheet.

Description of the Background

In recent years, a flat display panel is widely used, and a liquid crystal display (LCD) is typically used.

Generally, the liquid crystal display requires a backlight unit that provides uniform light throughout a screen, unlike a conventional CRT type.

Specifically, the backlight unit is configured to provide uniform light from a rear surface of the liquid crystal display. Here, an LED, which is a light source, is disposed on one side of a light guide plate, and a reflection plate is provided on a lower surface of the light guide plate so that light emitted to the lower surface and the side surface of the light source can be reflected to the top.

In such a configuration, the light generated by the light source is transmitted to the top by the light guide plate and the reflection plate, and the light transmitted to the top is uniformly supplied to the top again after passing through a diffusion sheet and a light collecting sheet.

In addition, a separate reflective polarizer sheet is provided on the top of the light collecting sheet to transmit only a specific polarized light to the liquid crystal panel surface of the top, thereby enhancing the luminance of the liquid crystal display.

Here, the light collecting sheet may be a sheet on which a general prism is formed.

As described above, the backlight unit is configured in such a manner that the light generated from the light source provided on the side surface is transmitted to the top by the light guide plate and the reflection plate, and the light transmitted to the top is uniformly collected after passing through the diffusion sheet and the light collecting sheet.

Meanwhile, a reflective polarizer sheet can be provided in the backlight unit. The reflective polarizer sheet transmits a light having a specific polarization state, i.e., a light having the same polarization as that of the liquid crystal panel, to the liquid crystal panel surface, and the light that is not transmitted is reflected downwardly.

As described above, the overall luminance of the liquid crystal display is increased through a repetitive recycling in which the light reflected downwardly by the reflective polarizer sheet is reflected by the reflection plate or the like positioned on the lower surface of the light guide plate, and then is transferred to the top.

However, since a specific polarized light which is not transmitted is recycled inside the backlight by reflection or the like, there is a problem in that the luminance of display is restricted.

SUMMARY

Accordingly, the present disclosure is directed to a reflective polarizer module having light recycling improving sheet and a backlight unit having the same that substantially obviate one or more problems due to limitations and disadvantages of the prior art.

The present disclosure has been made in view of the above problems, and provides a reflective polarizer module having a light recycling improving sheet for improving a recycling which is disposed at the bottom of a reflective polarizer sheet and which randomly changes the polarized direction of light that is not transmitted through the reflective polarizer sheet but is reflected so that a light reflected on a reflection plate or the like on the lower surface of a light guide plate and then is transferred to the top again can be transmitted through the reflective polarizer sheet.

The technical problem to be solved by the present disclosure is not limited to the above-mentioned technical problems, and other technical subjects not mentioned may be clearly understood by those skilled in the art from the following description.

In order to solve the above problems, in an aspect, there is provided a reflective polarizer module including: a first light collecting sheet including a first structuring pattern having a first unit light collector, a cross-sectional area of which is reduced progressively upward, which is disposed continuously in a repetitive manner, and collecting a light transmitted from below; a reflective polarizer sheet disposed in a stacked configuration on a top of the first light collecting sheet, and selectively transmitting the light by having a plurality of stacked layers having mutually different refractive indices; and a light recycling improving sheet disposed at a bottom of the reflective polarizer sheet, and randomly changing a polarized direction of light which is not transmitted through the reflective polarizer sheet but is reflected downward.

The reflective polarizer module further includes a separate adhesive layer formed on a lower surface of the light recycling improving sheet, wherein at least a part of the first structuring pattern is embedded in the adhesive layer. The first light collecting sheet is bonded to a lower surface of the light recycling improving sheet.

The light recycling improving sheet includes a first diffusion pattern, which is formed of a plurality of first diffusion protrusions having a protruding form and which is formed on a lower surface of the light recycling improving sheet to diffuse the light.

The first diffusion protrusion has a non-uniform size and is formed on a lower surface of the light recycling improving sheet irregularly.

The reflective polarizer sheet includes a second diffusion pattern, which is formed of a plurality of second diffusion protrusions having a protruding form and which is formed on an upper surface of the reflective polarizer sheet to diffuse the light.

The second diffusion protrusion has a non-uniform size and is formed on the upper surface of the reflective polarizer sheet irregularly.

The light recycling improving sheet is a high-polymer having birefringence, and is formed of at least one of polyester, polyester copolymer (PET, PEN, CoPEN, CoPET), acrylic (PMMA), polycarbonate (PC), cycloolefin polymer (COP, COC), and polyethersulfone (PES).

In another aspect, there is provided a backlight unit including: a light guide plate having a light source disposed at one side of the light guide plate, and transmitting light generated from the light source; a reflection plate stacked on a lower surface of the light guide plate and reflecting the light transmitted through the light guide plate upwardly; an optical module comprising a diffusion sheet stacked on a top of the light guide plate to diffuse the light transmitted from below uniformly, and a second light collecting sheet, bonded to a top of the diffusion sheet, having a second structuring pattern having a second unit light collector, a cross-sectional area of which is reduced progressively upward, which is disposed continuously in a repetitive manner; and a reflective polarizer module comprising a first light collecting sheet including a first structuring pattern having a first unit light collector, a cross-sectional area of which is reduced progressively upward, that is disposed continuously in a repetitive manner, and collecting the light transmitted from below; a reflective polarizer sheet disposed in a stacked configuration on a top of the first light collecting sheet, and selectively transmitting the light by having a plurality of stacked layers having mutually different refractive indices; and a light recycling improving sheet disposed at a bottom of the reflective polarizer sheet, and randomly changing a polarized direction of the light which is not transmitted through the reflective polarizer sheet but is reflected downward, wherein the light having the polarized direction changed in the light recycling improving sheet moves downward and is reflected again from below to be transmitted to the reflective polarizer sheet.

The reflective polarizer module further includes a separate adhesive layer formed on a lower surface of the light recycling improving sheet, and at least a part of the first structuring pattern is embedded in the adhesive layer. The first light collecting sheet is bonded to a lower surface of the light recycling improving sheet.

In still another aspect, there is provided a reflective polarizer module including: a reflective polarizer sheet having a first structuring pattern, disposed on an upper surface of the reflective polarizer sheet, having a first unit light collector, a cross-sectional area of which is reduced progressively upward, which is disposed continuously in a repetitive manner, and selectively transmitting a light by having a plurality of stacked layers having mutually different refractive indices; and a light recycling improving sheet disposed at a bottom of the reflective polarizer sheet, and randomly changing a polarized direction of the light which is not transmitted through the reflective polarizer sheet but is reflected downward.

The light recycling improving sheet includes a first diffusion pattern, which is formed of a plurality of first diffusion protrusions having a protruding form and which is formed on a lower surface of the light recycling improving sheet to diffuse light. The first diffusion protrusion has a non-uniform size and is formed on a lower surface of the light recycling improving sheet irregularly.

The light recycling improving sheet is a high-polymer having birefringence, and is formed of at least one of polyester, polyester copolymer (PET, PEN, CoPEN, CoPET), acrylic (PMMA), polycarbonate (PC), cycloolefin polymer (COP, COC), and polyethersulfone (PES).

In still another aspect, there is provided a backlight unit including: a light guide plate having a light source disposed at one side of the light guide plate, and transmitting light generated from the light source; a reflection plate stacked on a lower surface of the light guide plate and reflecting the light transmitted through the light guide plate upwardly; an optical module comprising a diffusion sheet stacked on a top of the light guide plate to diffuse the light transmitted from below uniformly, and a second light collecting sheet, bonded to a top of the diffusion sheet, having a second structuring pattern having a second unit light collector, a cross-sectional area of which is reduced progressively upward, which is disposed continuously in a repetitive manner; and a reflective polarizer module comprising a reflective polarizer sheet having a first structuring pattern, disposed on an upper surface of the reflective polarizer sheet, having a first unit light collector, a cross-sectional area of which is reduced progressively upward, that is disposed continuously in a repetitive manner, and selectively transmitting the light by having a plurality of stacked layers having mutually different refractive indices; and a light recycling improving sheet disposed at a bottom of the reflective polarizer sheet, and randomly changing a polarized direction of light which is not transmitted through the reflective polarizer sheet but is reflected downward, wherein the light having the polarized direction changed in the light recycling improving sheet moves downward and is reflected again from below to be transmitted to the reflective polarizer sheet.

In still another aspect, there is provided a reflective polarizer module including: a reflective polarizer sheet selectively transmitting a light by having a plurality of stacked layers having mutually different refractive indices; a light recycling improving sheet disposed at a bottom of the reflective polarizer sheet, and randomly changing a polarized direction of light which is not transmitted through the reflective polarizer sheet but is reflected downward; and a first light collecting sheet including a first structuring pattern having a first unit light collector, a cross-sectional area of which is reduced progressively downward from a lower surface of the light recycling improving sheet, which is disposed continuously in a repetitive manner, and collecting light transmitted from below.

The light recycling improving sheet includes a first diffusion pattern, which is formed of a plurality of first diffusion protrusions having a protruding form and which is formed on a lower surface of the light recycling improving sheet to diffuse light.

In still another aspect, there is provided a backlight unit including: a light guide plate having a light source disposed at one side of the light guide plate, and transmitting light generated from the light source; a reflection plate stacked on a lower surface of the light guide plate and reflecting the light transmitted through the light guide plate upwardly; a diffusion sheet stacked on a top of the light guide plate to diffuse the light transmitted from below uniformly; and a reflective polarizer module comprising a reflective polarizer sheet selectively transmitting the light by having a plurality of stacked layers having mutually different refractive indices, a light recycling improving sheet disposed at a bottom of the reflective polarizer sheet, and randomly changing a polarized direction of light which is not transmitted through the reflective polarizer sheet but is reflected downward, and a first light collecting sheet including a first structuring pattern having a first unit light collector, a cross-sectional area of which is reduced progressively downward from a lower surface of the light recycling improving sheet, which is disposed continuously in a repetitive manner, and collecting the light transmitted from below, wherein the light having the polarized direction changed in the light recycling improving sheet moves downward and is reflected again from below to be transmitted to the reflective polarizer sheet.

In order to solve the above problems, the present disclosure has the following effects.

First, a separate light recycling improving sheet is provided on the lower surface of the reflective polarizer sheet so as to randomly change the polarized direction of the light that is not transmitted through the reflective polarizer sheet but is reflected so that a recycling of the light reflected again at the bottom can be enhanced and the reflected light can be transmitted through the reflective polarizer sheet, thereby increasing the overall luminance of the display.

Second, the reflective polarizer module according to the present disclosure can be integrally formed by stacking the reflective polarizer sheet having the first structuring pattern formed on the upper surface thereof and the light recycling improving sheet, thereby reducing the overall thickness to realize slimness of the backlight unit and eliminating the phenomenon of Newton ring occurring due to separation and contact of some area between sheets.

The effects of the present disclosure are not limited to the effects mentioned above, and other effects not mentioned can be clearly understood by those skilled in the art from the description of the claims. Further, it is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION

Figure 1:
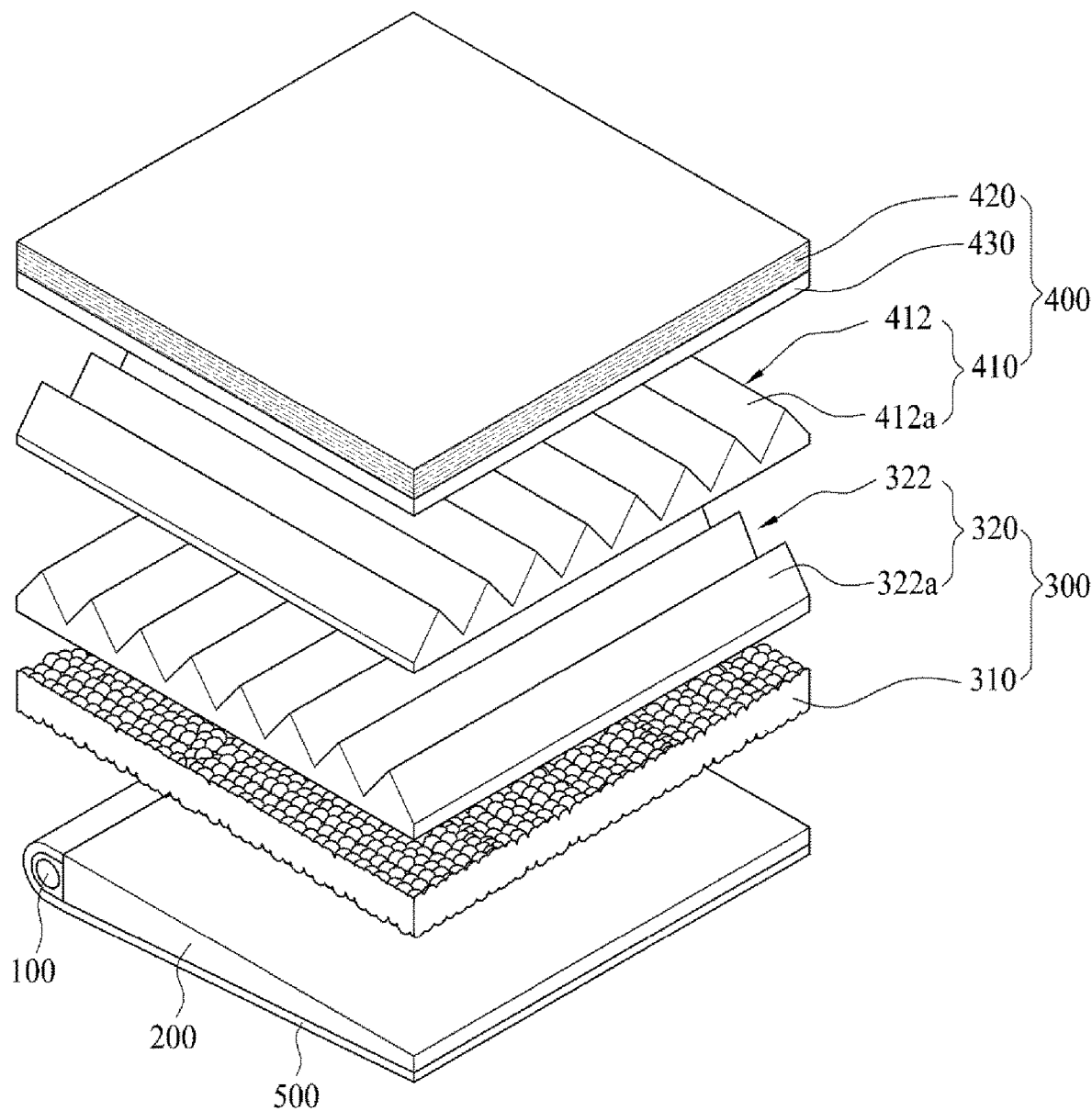
FIG. 1 is an exploded perspective view schematically illustrating a configuration of a backlight unit having a reflective polarizer module according to a first aspect of the present disclosure.

Hereinafter, aspects of the present disclosure will be described with reference to the accompanying drawings. In describing the aspects of the disclosure, the same designations and the same reference numerals are used for the same components, and further description thereof will be omitted.

In the following description, it is described on the premise that a backlight unit having a reflective polarizer module according to an aspect of the present disclosure is applied to a flat panel liquid crystal display such as an LCD or an LED panel. However, the present disclosure is not limited thereto, but an optical sheet may be used alone. Alternatively, the backlight unit may not be applied to a liquid crystal display but may be applied to other equipment, or may be applied to any device, such as a lighting device, that changes the characteristics and path of light.

First, referring to FIG. 1 to FIG. 4, a schematic configuration of a backlight unit to which a reflective polarizer module according to a first aspect of the present disclosure is applied will be described.

Figure 2:
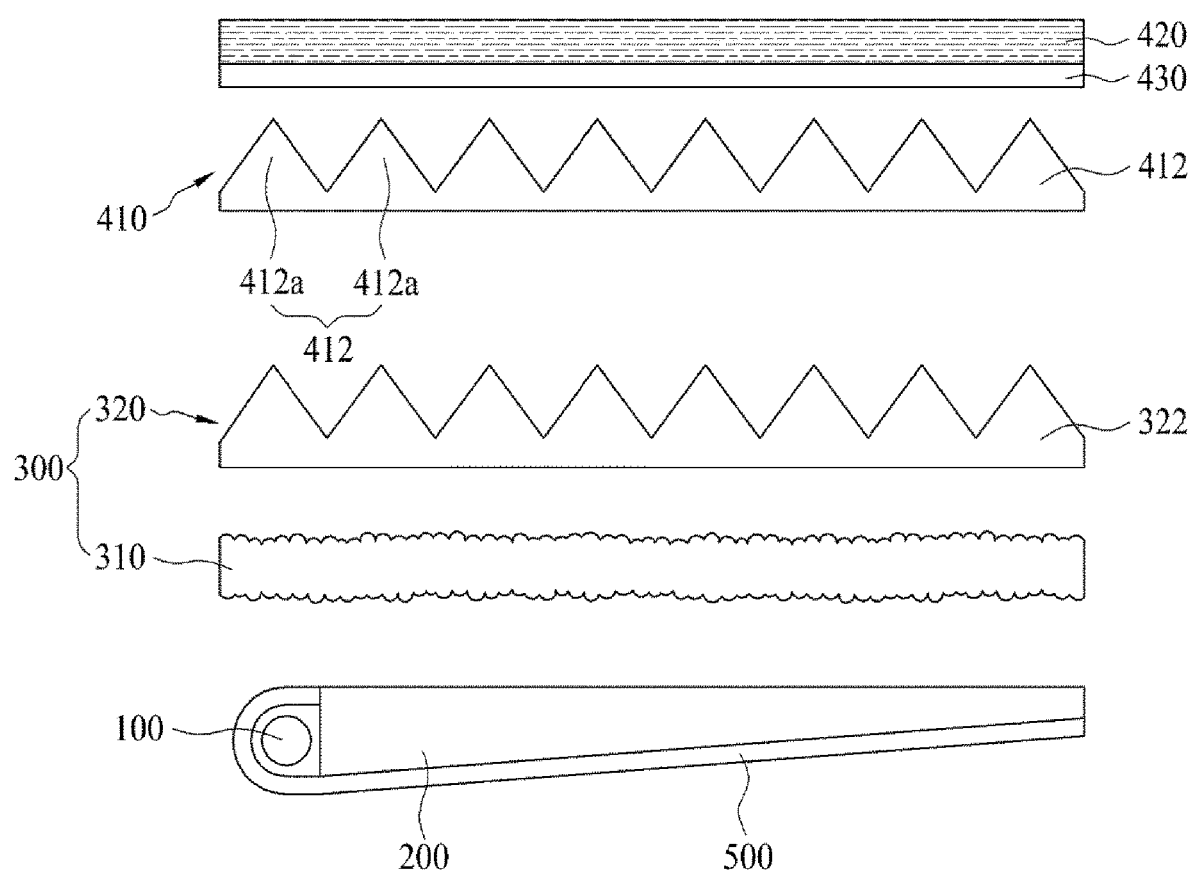
FIG. 2 is a schematic view of the configuration of the reflective polarizer module and an optical module in the backlight unit of FIG. 1.

FIG. 1 is an exploded perspective view schematically illustrating a configuration of a backlight unit having a reflective polarizer module according to a first aspect of the present disclosure, and FIG. 2 is a schematic view of the configuration of the reflective polarizer module and an optical module in the backlight unit of FIG. 1.

Figure 3:
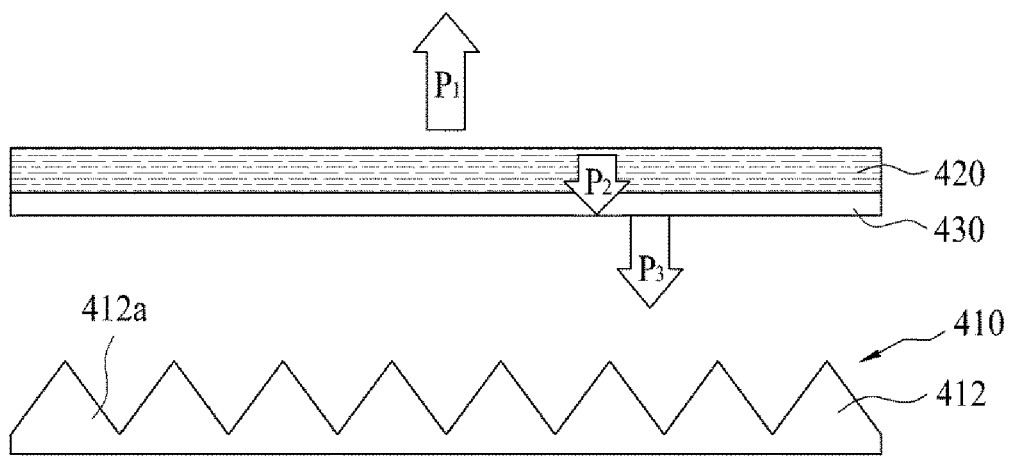
FIG. 3 is a view illustrating a reflective polarizer sheet which transmits only a part of light in the backlight unit of FIG. 1.
Figure 4:
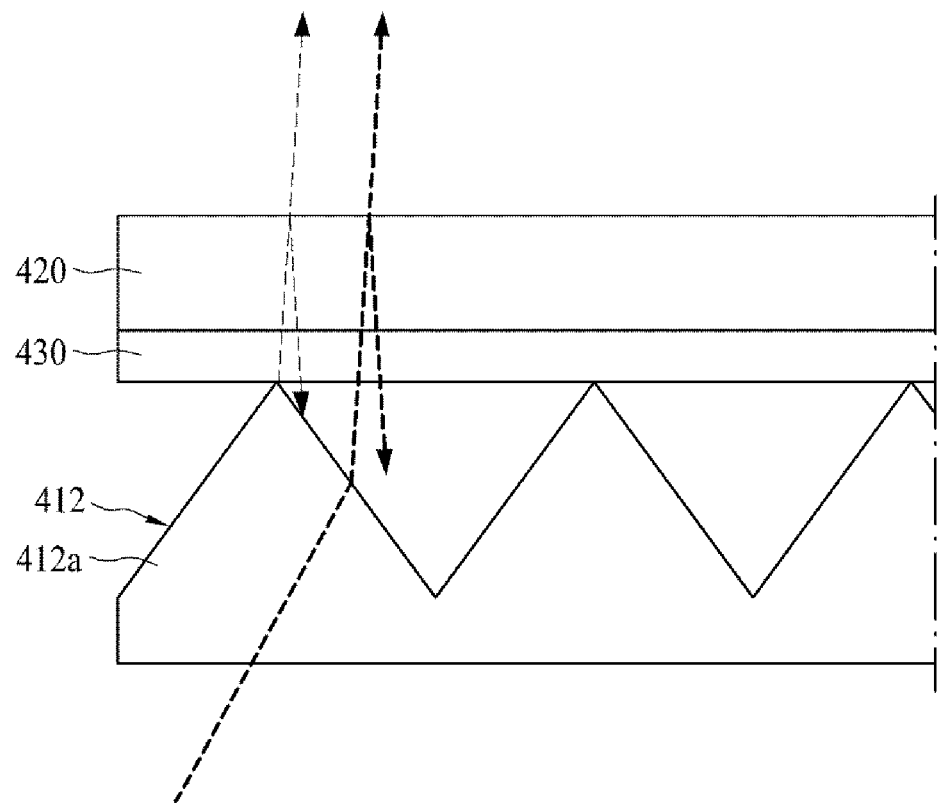
FIG. 4 is a view illustrating a light recycling improving sheet which randomizes the polarized direction of the light reflected by the reflective polarizer sheet and transmits downwardly in the backlight unit of FIG. 1.

In addition, FIG. 3 is a view illustrating a reflective polarizer sheet which transmits only a part of light in the backlight unit of FIG. 1, and FIG. 4 is a view illustrating a light recycling improving sheet which randomizes the polarized direction of the light reflected by the reflective polarizer sheet and transmits downwardly in the backlight unit of FIG. 1.

As shown in FIG. 1, a backlight unit (BLU) for providing light to a liquid crystal panel should be provided requisitely so as to implement a liquid crystal display. Such a backlight unit includes a light source 100, a light guide plate 200, a reflection plate 500, an optical module 300, and a reflective polarizer module 400.

The light source 100 is generally formed of a luminous body that emits light, and emits light at a side portion of the light guide plate 200 to transmit the light toward the light guide plate 200.

The light guide plate 200 transmits the light transmitted from the light source 100 toward the optical module 300.

The reflection plate 500 is disposed on the lower surface of the light guide plate 200 to reflect upwardly the light emitted to the lower surface and the side surface of the light source.

Here, the light guide plate 200 and the reflection plate 500 are provided in a stacked configuration and provided with the light source 100 formed at the side portion. Since the light emitted from the light source 100 is reflected by the light guide plate 200 and the reflection plate 500, the light can be stably transmitted to the optical module 300 and the reflective polarizer module 400 even if the light source 100 is provided on the side portion.

The optical module 300 is disposed on the top of the light guide plate 200 and diffuses the light transmitted from the light guide plate 200 and collects the diffused light to transmit to the top. The optical module 300 includes a diffusion sheet 310 and a second light collecting sheet 320.

The diffusion sheet 310 is disposed on the top of the light guide plate 200 to diffuse the light and uniformly transmit the light to the second light collecting sheet 320.

Specifically, the diffusion sheet 310 is configured to uniformly diffuse the light transmitted to the top through the light guide plate 200 provided at the bottom and transmit the light to the second light collecting sheet 320 located at the top. A non-uniform pattern is formed on the top or bottom of the diffusion sheet 310 to diffuse the light.

The second light collecting sheet 320 may have a second structuring pattern 322 and may be bonded to the top of the diffusion sheet 310. The second structuring pattern 322 is composed of a plurality of second unit light collectors 322a having a prism shape which are disposed continuously in a repetitive manner and protrude upwardly, and the cross-sectional area of which is reduced when progressing upwardly.

The second unit light collector 322a refracts and collects the light transmitted from the bottom and transmits the light to the top.

Here, the second structuring pattern 322 includes a plurality of prism shapes having the upper and lower end portions of a triangular shape that are extended along one direction.

At this time, a plurality of second unit light collectors 322a are provided and each second unit light collector 322a may have the same size and shape. On the other hand, it may have a different size and a different inclined angle of inclined plane.

In addition, the second unit light collector 322a may have a dual inclined plane and each plane may have a different inclined angle so that a cross-sectional shape along the vertical direction may have a polygonal shape.

In the present aspect, the second unit light collector 322a is formed to extend in one direction along the upper surface of the second collector sheet 320, and a plurality of the second unit light collectors 322a are continuously disposed.

The optical module 300 includes the diffusion sheet 310 for diffusing light transmitted through the light guide plate 200 and the second collector sheet 320 which is disposed on the top of the diffusion sheet 310 and which collects and transmits the diffused light upwardly, so that the light transmitted from the bottom can be collected and transmitted to the top.

Meanwhile, the reflective polarizer module 400 is disposed in a stacked configuration on the top or bottom of the above described optical module 300 and collects and polarizes light transmitted from the bottom to transmit uniformly to the top. In the present disclosure, the reflective polarizer module 400 includes a reflective polarizer sheet 420, a first light collecting sheet 410, and a light recycling improving sheet 430.

The reflective polarizer sheet 420 transmits only a specific polarized light or a specific type of light that oscillates in a specific direction among the light collected and transmitted by the above described optical module 300 and reflects the remaining light back to the bottom. The reflective polarizer sheet 420 is stacked and bonded to the top of the optical module 300.

In general, the reflective polarizer sheet 420 is implemented in a stack of multilayer and may function as a reflective polarizer or mirror that reflects a specific polarized light. In addition, it may also function as a wavelength selective reflection plate, such as a "cold mirror" that reflects visible light and passes infrared light, or a "hot mirror" that passes visible light and reflects infrared light.

The reflective polarizer sheet 420 as used in the present disclosure exhibits a high reflectivity for an off-angle as well as for a normal ray, and a low absorptance for an incident ray. This characteristic typically determines whether the reflective polarizer sheet 420 is used for the simple reflection of light or the reflective polarization.

Such a reflective polarizer sheet 420 may be formed by laminating tens, hundreds, or thousands different high refractive index layers and low refractive index layers.

In the first aspect of the present disclosure, the reflective polarizer sheet 420 is provided on the top of the first light collecting sheet 410 as shown in FIG. 3, and the light directed to the reflective polarizer sheet 420 has a mixed state of different polarized lights and is composed of a light P1 having a polarized light of an area which is transmitted through the reflective polarizer sheet 420 and a light P2 of an area which is not transmitted through the reflective polarizer sheet 420.

As shown in the drawing, the light passed through the first light collecting sheet 410 and the second light collecting sheet 320 may be in a mixed state of P1 and P2 having various forms of oscillation, but the reflective polarizer sheet 420 transmits only the light P1 and reflects the light P2 back downwardly.

Therefore, the light P1 is emitted to the outside, but the light P2 is reflected and returned to the bottom and is reflected again by the first light collecting sheet 410, the second light collecting sheet 320, and the light guide plate 200 to move to the top.

In this process, the light recycling improving sheet 430, which will be described later, changes the polarization state of the light P2, which can be repeated so that the polarized direction can be changed into a suitable state for the reflective polarizer sheet 420 to transmit.

In the meantime, the light recycling improving sheet 430 is bonded on the lower surface of the reflective polarizer sheet 420 in a stacked configuration to randomly change the polarized direction of the light that is not transmitted through the reflective polarizer sheet 420 but is reflected downwardly.

As shown in the aspect of the present disclosure, the light recycling improving sheet 430 randomly changes the polarized direction of the light P2 that is not transmitted through the reflective polarizer sheet 420 but is reflected.

Thus, the polarized direction of light P2 is irregularly changed due to the reflective polarizer sheet 420 and is transmitted to the bottom.

As described above, the light recycling improving sheet 430 randomly changes the polarized direction of the light that is reflected by the reflective polarizer sheet 420 to transmit to the bottom, so that the light that is reflected by the light guide plate 200 and the reflection plate 500 and moves upwardly can pass through the reflective polarizer sheet 420.

Accordingly, since the light recycling improving sheet 430 randomly changes the polarized direction of the light that is reflected by the reflective polarizer sheet 420, a recycling of the light reflected downwardly from the reflective polarizer sheet 420 can be improved and the reflected light can pass through the reflective polarizer sheet 420.

Here, the light recycling improving sheet 430 is a high-polymer having birefringence, and may be formed of a material such as polyester, polyester copolymer (PET, PEN, CoPEN, CoPET), acrylic (PMMA), polycarbonate (PC), cycloolefin polymer (COP, COC), polyethersulfone (PES), etc.

In the first aspect of the present disclosure, as shown in FIG. 4, the light P2 reflected by the reflective polarizer sheet 420 is changed into the light P3 whose polarized direction is randomized by the light recycling improving sheet 430, and the light P3 is reflected by the light guide plate 200 and the reflection plate 500 and then transmitted to the top.

Referring to FIG. 4, the light recycling improving sheet 430 is disposed in the bottom of the reflective polarizer sheet 420, and the first light collecting sheet 410 which will be described later is disposed below in a stacked configuration.

The light, which is not transmitted through but is reflected by the reflective polarizer sheet 420, is transmitted to the bottom after the polarized direction of the light is changed due to the light recycling improving sheet 430.

Accordingly, the light recycling improving sheet 430 randomly changes the polarized direction of the light reflected downwardly from the reflective polarizer sheet 420, so that the light having the changed polarized direction is recycled again from the bottom to pass through the reflective polarizer sheet 420.

That is, the reflective polarizer sheet 420 is a sheet that partially transmits the light and partially reflects light, and the light that is not transmitted through the reflective polarizer sheet 420 is reflected downwardly, and the reflected light is transmitted through the light recycling improving sheet 430 while the polarized direction is changed.

The light having the polarized direction changed by the light recycling improving sheet 430 is recycled from the bottom and transferred to the top, and a part of the light is transmitted through the reflective polarizer sheet 420 again.

According to such a recycling process of light, the light that cannot be transmitted through the reflective polarizer sheet 420 passes through the light recycling improving sheet 430 and the polarized direction is changed. Thus, the amount of light transmitted through the reflective polarizer sheet 420 is increased by repeating the recycling of being reflected from the reflection plate 500 or the like, thereby increasing the luminance.

Meanwhile, the first light collecting sheet 410 includes a first structuring pattern 412 that has a first unit light collector 412a, the cross-sectional area of which is reduced progressively upward, that is disposed continuously in a repetitive manner, and is disposed in a stacked configuration on the top of the second light collecting sheet 320.

In addition, it is configured to collect again the light collected and transmitted from the second light collecting sheet 320 and transmit to the top.

At this time, the first unit light collector 412a may be formed in the same manner as the second unit light collector 322a, or may be formed differently from the second unit light collector 322a.

In the present disclosure, the first light collecting sheet 410 is formed in a similar manner to the second light collecting sheet 320 described above, and the first light collecting sheet 410 formed in such a manner is disposed at the bottom of the light recycling improving sheet 430 in a stacked configuration.

Here, the upper end of the first unit light collector 412a may be bonded to the lower surface of the light recycling improving sheet 430, or may simply be maintained in a stacked state.

Meanwhile, in the present aspect, the first structuring pattern 412 and the second structuring pattern 322 are extended along the lateral direction, and the extending direction of the first structuring pattern 412 is disposed in a direction intersecting the extending direction of the second structuring pattern 322.

In the present aspect, the first structuring pattern 412 and the second structuring pattern 322 may extend perpendicularly to each other. Alternatively, the first structuring pattern 412 and the second structuring pattern 322 may be disposed in a direction that is not perpendicular but simply intersects.

Accordingly, the light diffused in the diffusion sheet 310 and transmitted to the top can be stably collected via the first unit light collector 412a and the second unit light collector 322a.

The backlight unit of the present disclosure having such a configuration is stacked and bonded in sequence of the light guide plate 200, the optical module 300, and the reflective polarizer module 400, and stably diffuse and collect the light generated from the light source 100 to transmit. In addition, the polarized direction of the light reflected from the reflective polarizer sheet 420 is randomly changed in the light recycling improving sheet 430.

As described above, a part of the light having the polarized direction randomly changed through the light recycling improving sheet 430 is transferred to the reflective polarizer sheet 420 again to be transmitted, thereby increasing the overall luminance.

Meanwhile, as described above, since the light recycling improving sheet 430 is provided on the lower surface of the reflective polarizer sheet 420, a recycling is achieved in such a manner that the polarized direction is randomly changed by the light recycling improving sheet 430, and the light reflected by the reflective polarizer sheet 420 is repeatedly recycled between the reflective polarizer sheet 420 and the reflective plate 500.

Thus, the amount of light transmitted through the reflective polarizer sheet 420 is increased, thereby improving the overall luminance.

Next, a configuration in which a separate adhesive layer 440 is further provided between the light recycling improving sheet and the first light collecting sheet 410 in the backlight unit according to the present disclosure will be described with reference to FIG. 5.

Figure 5:
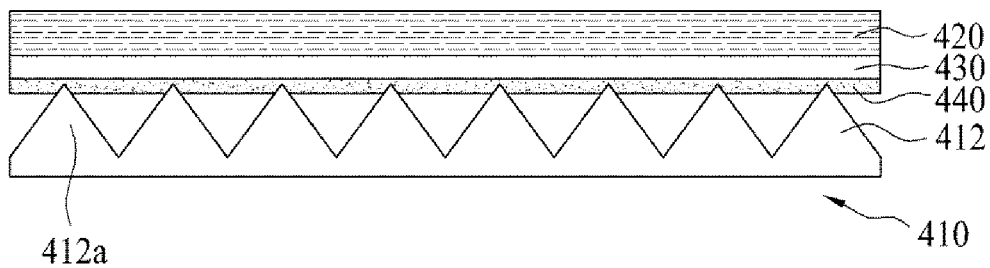
FIG. 5 is a view illustrating a state in which a part of the first light collecting sheet is embedded and bonded into a separate adhesive layer in the backlight unit of FIG. 1.

FIG. 5 is a view illustrating a state in which a part of the first light collecting sheet 410 is embedded and bonded into a separate adhesive layer 440 in the backlight unit of FIG. 1.

As shown in the drawing, in the reflective polarizer module 400 according to the aspect of the present disclosure, the first light collecting sheet 410 is laminated in a stacked configuration at the bottom of the light recycling improving sheet 430. At this time, a separate adhesive layer 440 may be further included on the lower surface of the light recycling improving sheet 430.

Specifically, as the adhesive layer 440 is provided on the lower surface of the light recycling improving sheet 430, a part of the first structuring pattern 412 formed in the first light collecting sheet 410 is embedded in the adhesive layer 440, so that the light recycling improving sheet 430 and the first light collecting sheet 410 can stably maintain the stacked state.

Next, a configuration in which a first diffusion pattern 432 and a second diffusion pattern 422 are further provided in the backlight unit according to the present disclosure will be described with reference to FIG. 6.

Figure 6:
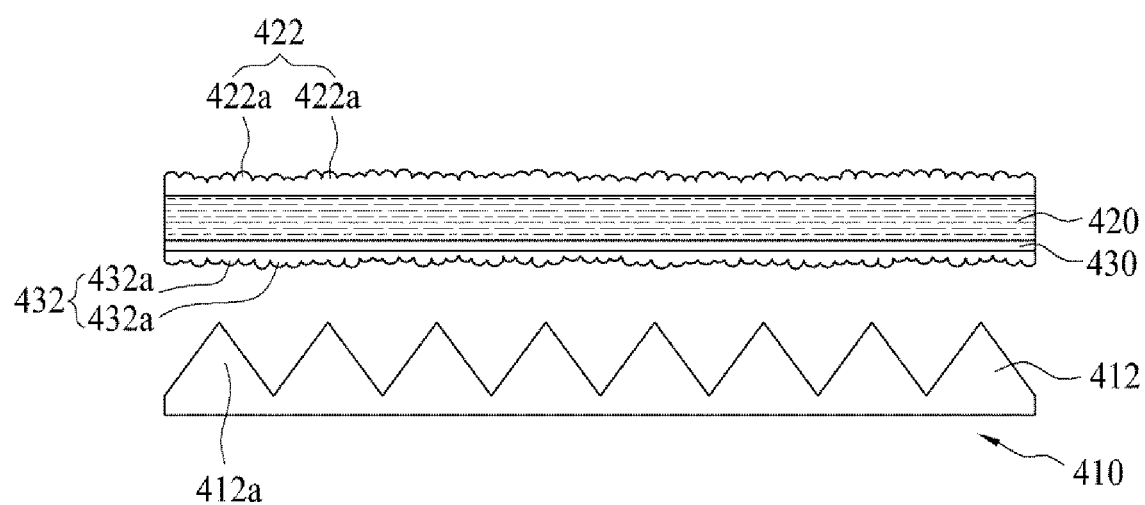
FIG. 6 is a view illustrating a state in which a first diffusion pattern and a second diffusion pattern are formed on the lower surface of the light recycling improving sheet and the upper surface of the reflective polarizer sheet in the backlight unit of FIG. 1 respectively.

FIG. 6 is a view illustrating a state in which the first diffusion pattern 432 and the second diffusion pattern 422 are formed on the lower surface of the light recycling improving sheet 430 and the upper surface of the reflective polarizer sheet 420 in the backlight unit of FIG. 1 respectively.

As shown in the drawing, in the reflective polarizer module 400 according to the present disclosure, the first diffusion pattern 432 formed of a plurality of first diffusion protrusions 432a is formed on the lower surface of the light recycling improving sheet 430, thereby diffusing the light reflected from the reflective polarizer sheet 420.

At this time, the light is diffused in a state where the polarized direction of the light is randomly changed by the light recycling improving sheet 430.

Specifically, the first diffusion pattern 432 has a plurality of first diffusion protrusions 432a having a protruding form on the lower surface of the light recycling improving sheet 430, and the first diffusion protrusions 432a are continuously formed.

Here, the first diffusion pattern 432 may be irregularly disposed in various sizes and shapes, and may have a different material or different refractive index from the light recycling improving sheet 430.

In the first aspect, the first diffusion protrusion 432a is formed in a spherical shape, and reflects or refracts light at various angles through a spherical surface to diffuse the light traveling through the light recycling improving sheet 430.

Alternatively, the first diffusion protrusion 432a may be formed in various shapes of polygons or an asymmetric shape instead of a spherical shape.

Here, the first diffusion protrusion 432a may be a result of dispersing diffusion particles such as bead to a polymer resin, or a part of the diffusion particles may be embedded in the polymer resin and only the remaining part may be exposed.

The light diffused by the first diffusion pattern 432 is transmitted again to the bottom and recycled at the bottom.

Meanwhile, as shown in the drawing, a second diffusion pattern 422 formed of a plurality of second diffusion protrusions 422a may be formed on the upper surface of the reflective polarizer sheet 420.

The pattern is formed on the upper surface of the reflective polarizer sheet 420 to diffuse the light transmitted through the reflective polarizer sheet 420, and has various sizes similarly to the first diffusion pattern 432, and may be formed irregularly on the upper surface of the reflective polarizer sheet 420.

As described above, the second diffusion pattern 422 is formed on the upper surface of the reflective polarizer sheet 420, so that the light transmitted through the reflective polarizer sheet 420 can be diffused.

In the present aspect, the first diffusion pattern 432 and the second diffusion pattern 422 are formed on the lower surface of the light recycling improving sheet 430 and the upper surface of the reflective polarizer sheet 420 respectively, but only one of the first diffusion pattern 432 or the second diffusion pattern 422 may be provided.

Next, a schematic configuration of a second aspect according to the present disclosure will be described with reference to FIGS. 7 and 8.

Figure 7:
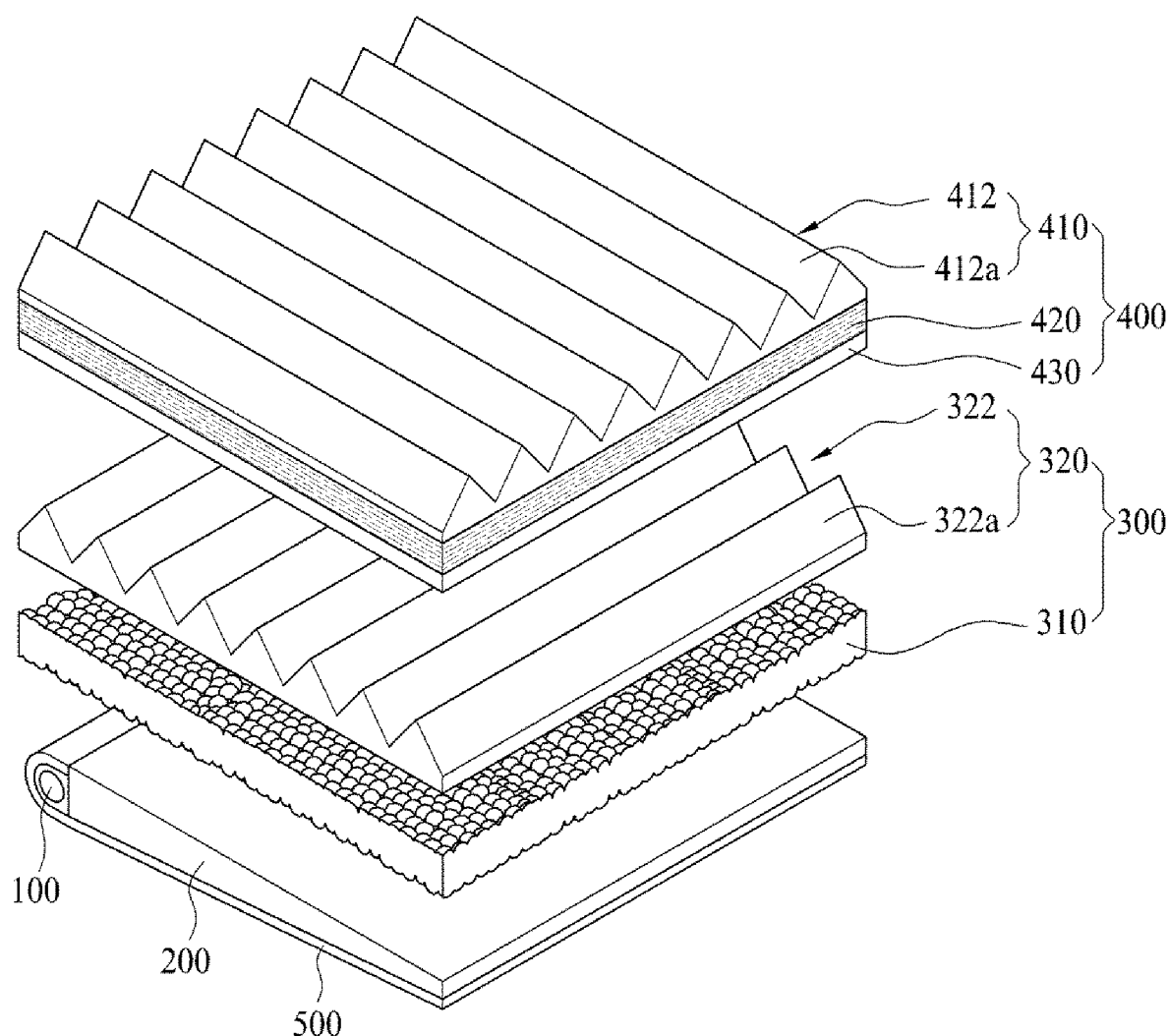
FIG. 7 is an exploded perspective view schematically illustrating a configuration of a backlight unit having a reflective polarizer module according to a second aspect of the present disclosure.
Figure 8:
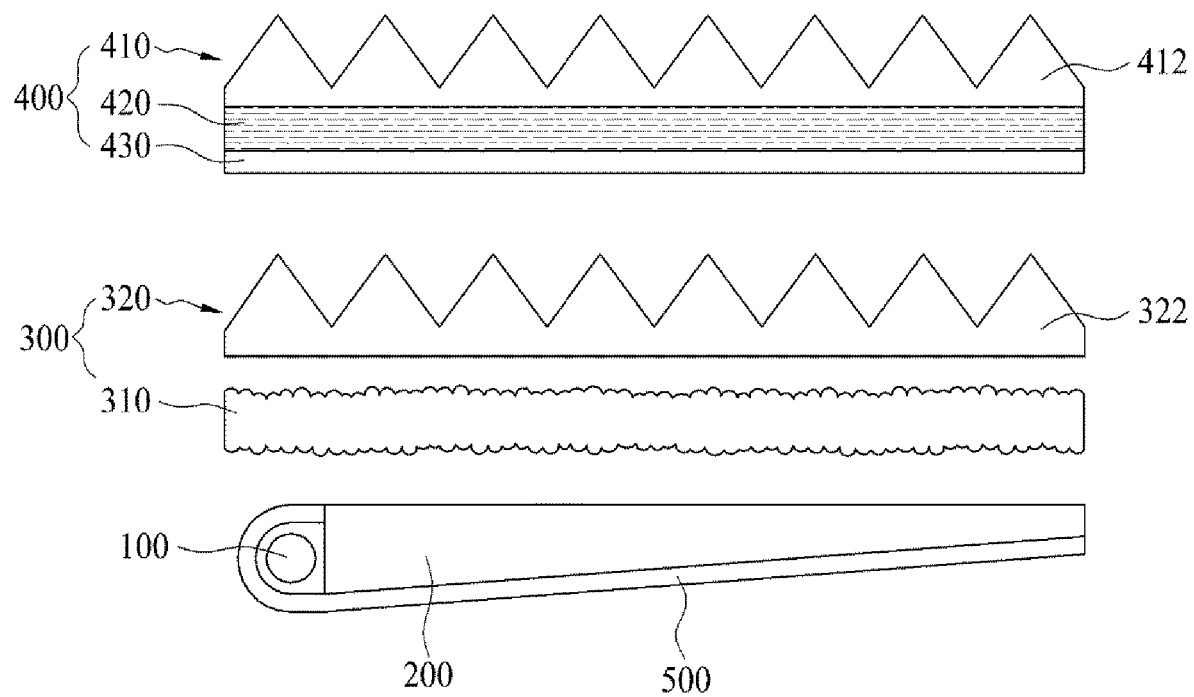
FIG. 8 is a schematic view illustrating a configuration of the reflective polarizer module and an optical module in the backlight unit of FIG. 7.

FIG. 7 is an exploded perspective view schematically illustrating a configuration of a backlight unit having the reflective polarizer module 400 according to a second aspect of the present disclosure, and FIG. 8 is a schematic view illustrating a configuration of the reflective polarizer module 400 and the optical module 300 in the backlight unit of FIG. 7.

As shown in the drawing, the basic configuration of the backlight unit according to the second aspect of the present disclosure is similar to that of the above mentioned first aspect, but is different from the configurations of the reflective polarizer sheet 420 and the light recycling improving sheet 430.

Specifically, the light recycling improving sheet 430 is provided on the lower surface of the reflective polarizer sheet 420, but the first structuring pattern 412 is directly formed on the upper surface of the reflective polarizer sheet 420.

In addition, the light recycling improving sheet 430 is provided on the lower surface of the reflective polarizer sheet 420 in a state where the first structuring pattern 412 is formed on the upper surface of the reflective polarizer sheet 420, and is disposed on the upper surface of the second light collecting sheet 320 in a stacked form.

That is, the first structuring pattern 412, the reflective polarizer sheet 420, and the light recycling improving sheet 430 are stacked in sequence.

As described above, since the first structuring pattern 412 is formed on the upper surface of the reflective polarizer sheet 420 and the light recycling improving sheet 430 is provided on the lower surface of the reflective polarizer sheet 420, the reflective polarizer module 400 itself is integrally formed, thereby reducing the overall thickness.

Accordingly, when the first structuring pattern 412 is formed on the upper surface of the reflective polarizer sheet 420, the overall thickness can be reduced to easily realize slimness when manufacturing the backlight unit, thereby eliminating Newton ring which may be created by the separation and contact of a part of the area between the sheets.

As described above, the reflective polarizer module 400 is configured according to the second aspect of the present disclosure, a part of the light collected after passing through the optical module 300 is reflected by the reflective polarizer sheet 420, and the polarized direction of the reflected light is randomly changed by the light recycling improving sheet 430.

In addition, the light having a changed polarized direction is reflected by the light guide plate 200 and the reflection plate 500 and the reflected light is collected after passing through the optical module 300 again, and then, a part of the light is transmitted through the reflective polarizer sheet 420, and is collected by the first structuring pattern 412.

Next, the first diffusion pattern 432 formed on the lower surface of the light recycling improving sheet 430 in the reflective polarizer module 400 according to the present disclosure will be described with reference to FIG. 9.

Figure 9:
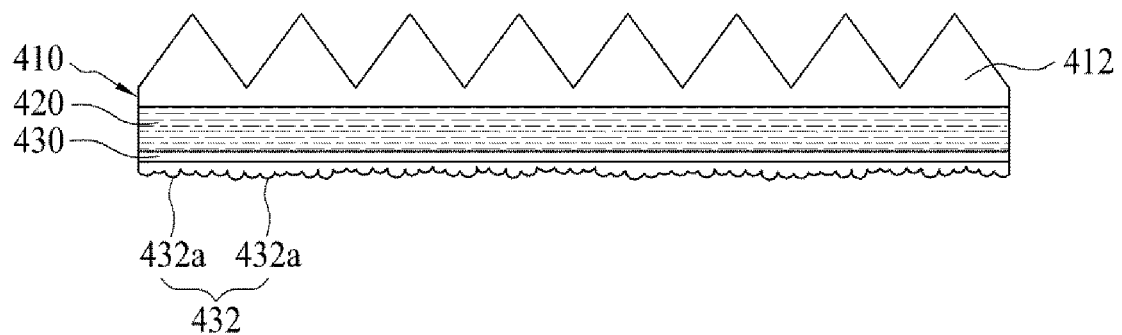
FIG. 9 is a view illustrating a state in which a first diffusion pattern is formed on the lower surface of the light recycling improving sheet in the reflective polarizer module of FIG. 7.

FIG. 9 is a view illustrating a state in which the first diffusion pattern 432 is formed on the lower surface of the light recycling improving sheet 430 in the reflective polarizer module 400 of FIG. 7.

In the reflective polarizer module 400 according to the present disclosure, the light recycling improving sheet 430 may further include the first diffusion pattern 432 for diffusing the light whose polarized direction is changed onto the lower surface.

Specifically, the first diffusion pattern 432 has a plurality of first diffusion protrusions 432a having a protruding form on the lower surface of the light recycling improving sheet 430, and the first diffusion protrusions 432a are continuously formed.

Here, the first diffusion pattern 432 may be irregularly disposed in various sizes and shapes, and may have a different material or different refractive index from the light recycling improving sheet 430.

In the present aspect, the first diffusion protrusion 432a is formed in a spherical shape, and refracts light at various angles through a spherical surface to diffuse the light traveling through the light recycling improving sheet 430.

Alternatively, the first diffusion protrusion 432a may be formed in various shapes of polygons or an asymmetric shape instead of a spherical shape.

Here, the first diffusion protrusion 432a may be a result of diffusing diffusion particles such as bead into a polymer resin, and a part of the diffusion particles may be embedded in the polymer resin and only the remaining part may be exposed.

In addition, the first diffusion protrusions 432a may be formed by a reproduction method using a master, or may be formed by using a separate processing roll.

Next, a configuration of a third aspect according to the present disclosure will be schematically described with reference to FIG. 10.

Figure 10:
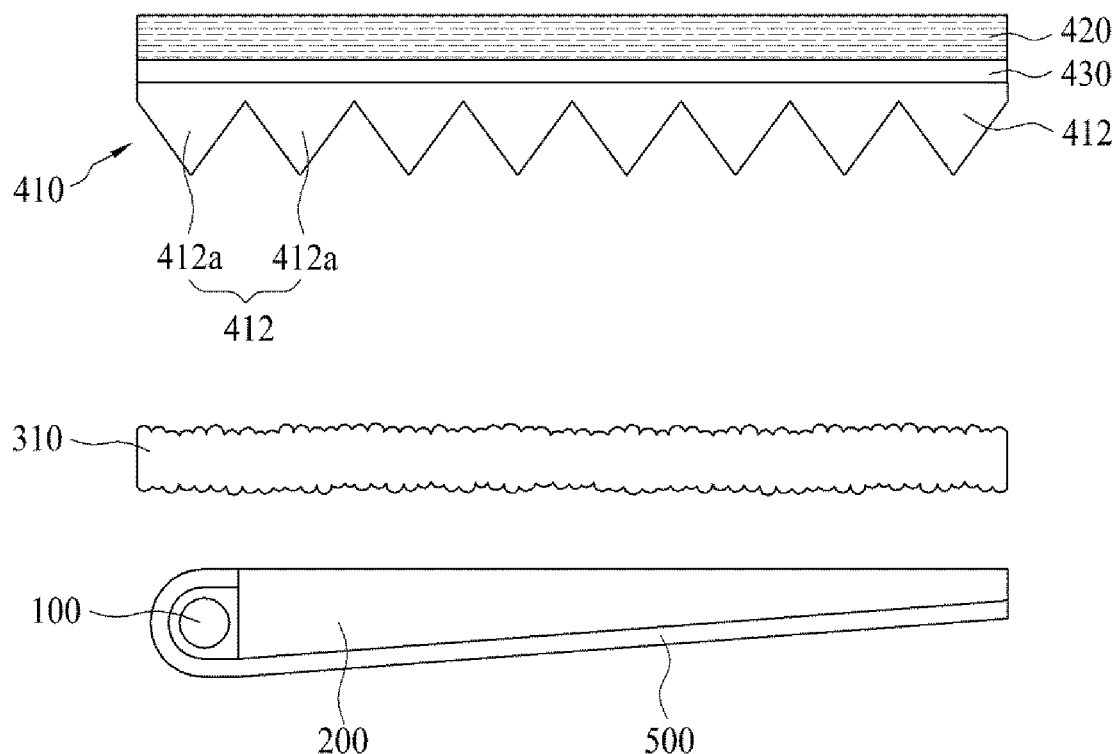
FIG. 10 is a view illustrating a configuration of a backlight unit having a reflective polarizer module according to a third aspect of the present disclosure.

FIG. 10 is a view illustrating a configuration of a backlight unit having a reflective polarizer module according to a third aspect of the present disclosure.

As shown in the drawing, the basic configuration of the backlight unit according to the third aspect of the present disclosure is similar to that of the above mentioned first aspect, but is different from the configurations of the first light collecting sheet 410 and the second light collecting sheet 320.

Specifically, the light recycling improving sheet 430 is provided on the lower surface of the reflective polarizer sheet 420, but the first structuring pattern 412 is directly formed on the lower surface of the light recycling improving sheet 430.

At this time, unlike the above, the first light collecting sheet 410 is formed in an inverted prism shape and the first structuring pattern 412 is formed on a lower surface of the light recycling improving sheet 430.

Specifically, the first light collecting sheet 410 includes the first structuring pattern 412 which has a first unit light collector 412a, the cross-sectional area of which is reduced progressively downward from the lower surface of the light recycling improving sheet 430, that is disposed continuously in a repetitive manner, and collects light transmitted from below.

In addition, unlike the above, a separate second light collecting sheet 320 is not provided, and the diffusion sheet 310 is disposed at the bottom of the first light collecting sheet 410 in a stacked manner.

Even if the reflective polarizer module 400 and the diffusion sheet 310 are stacked without the second light collecting sheet 320, the overall thickness is reduced in comparison with the above mentioned first aspect.

Accordingly, when the first light collecting sheet 410 is disposed in the form of an inverted prism on the lower surface of the light recycling improving sheet 430, the overall thickness 320 is reduced as the second light collecting sheet 320 does not exist, so that the thickness of the backlight unit can be minimized and the Newton ring created between the sheets can be eliminated.

As the reflective polarizer module 400 is configured according to the third aspect of the present disclosure, the light diffused by the diffusion sheet 310 is collected by the first light collecting sheet 410, and a part of the collected light is reflected by the reflective polarizer sheet 420.

In addition, the polarized direction of the light reflected by the reflective polarizer sheet 420 is randomly changed by the light recycling improving sheet 430 so that the light transmitted through the light recycling improving sheet 430 is recycled at the bottom and then transmitted to the reflective polarizer sheet 420 to be partially transmitted through the reflective polarizer sheet 420.

Although the exemplary aspects of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described aspects but is defined by the appended claims as well as equivalents thereto.

What is claimed is:

1. A reflective polarizer module comprising:
 a first light collecting sheet including a first structuring pattern having a first unit light collector, a cross-sectional area of which is reduced progressively upward, which is disposed continuously in a repetitive manner, and collecting a light transmitted from below;
 a reflective polarizer sheet disposed in a stacked configuration on a top of the first light collecting sheet, and selectively transmitting the light by having a plurality of stacked layers having mutually different refractive indices; and
 a light recycling improving sheet disposed at a bottom of the reflective polarizer sheet,
 wherein the light recycling improving sheet keeps randomly changing a polarized direction of the light which is not transmitted through the reflective polarizer sheet but is reflected downward outside the reflective polarizer module and directs the light with the randomly changed polarized direction back to the first light collecting sheet,
 wherein the light recycling improving sheet has a first diffusion pattern on a lower surface facing the first light collecting sheet and has a flat surface contacting the bottom of the reflective polarizer sheet,
 wherein the reflective polarizer sheet comprises a second diffusion pattern, which is formed of a plurality of second diffusion protrusions having a protruding form and is formed on an upper surface of the reflective polarizer sheet to diffuse the light, and
 wherein the first diffusion pattern is formed in various shapes of polygons.

2. The reflective polarizer module of claim 1, wherein the first diffusion pattern is formed of a plurality of first diffusion protrusions having a protruding form.

3. The reflective polarizer module of claim 2, wherein the first diffusion protrusion has a non-uniform size and is formed on a lower surface of the light recycling improving sheet irregularly.

4. The reflective polarizer module of claim 1, wherein the second diffusion protrusion has a non-uniform size and is formed on the upper surface of the reflective polarizer sheet irregularly.

5. The reflective polarizer module of claim 1, wherein the light recycling improving sheet is a high-polymer having birefringence, and is formed of at least one of polyester, polyester copolymer (PET, PEN, CoPEN, CoPET), acrylic (PMMA), polycarbonate (PC), cycloolefin polymer (COP, COC), and polyethersulfone (PES).

6. A backlight unit comprising:

a light guide plate having a light source disposed at one side of the light guide plate, and transmitting light generated from the light source;

a reflection plate stacked on a lower surface of the light guide plate and reflecting the light transmitted through the light guide plate upwardly;

an optical module comprising a diffusion sheet stacked on a top of the light guide plate to diffuse the light transmitted from below uniformly, and a second light collecting sheet, bonded to a top of the diffusion sheet, having a second structuring pattern having a second unit light collector, a cross-sectional area of which is reduced progressively upward, which is disposed continuously in a repetitive manner; and a reflective polarizer module comprising a first light collecting sheet including a first structuring pattern having a first unit light collector, a cross-sectional area of which is reduced progressively upward, which is disposed continuously in a repetitive manner, and collecting the light transmitted from below; a reflective polarizer sheet disposed in a stacked configuration on a top of the first light collecting sheet, and selectively transmitting the light by having a plurality of stacked layers having mutually different refractive indices; and a light recycling improving sheet disposed at a bottom of the reflective polarizer sheet, wherein the light recycling improving sheet keeps randomly changing a polarized direction of the light which is not transmitted through the reflective polarizer sheet but is reflected downward outside the reflective polarizer module and directs the light with the randomly changed polarized direction back to the first light colleting sheet, and the light recycling improving sheet has a first diffusion pattern on a lower surface facing the first light collecting sheet and has a flat surface contacting the bottom of the reflective polarizer sheet, wherein the light having the polarized direction changed in the light recycling improving sheet moves downward and is reflected again from below to be transmitted to the reflective polarizer sheet, wherein the reflective polarizer sheet comprises a second diffusion pattern, which is formed of a plurality of second diffusion protrusions having a protruding form and is formed on an upper surface of the reflective polarizer sheet to diffuse the light, and wherein the first diffusion pattern is formed in various shapes of polygons.

* * * * *